April 6, 1948.  T. M. FERRILL, JR  2,439,044
COURSE SOFTENING SYSTEM
Filed March 4, 1943  2 Sheets-Sheet 1

INVENTOR
T. M. FERRILL, JR.
BY
Herbert H. Thompson
his ATTORNEY.

April 6, 1948. T. M. FERRILL, JR 2,439,044
COURSE SOFTENING SYSTEM
Filed March 4, 1943 2 Sheets-Sheet 2
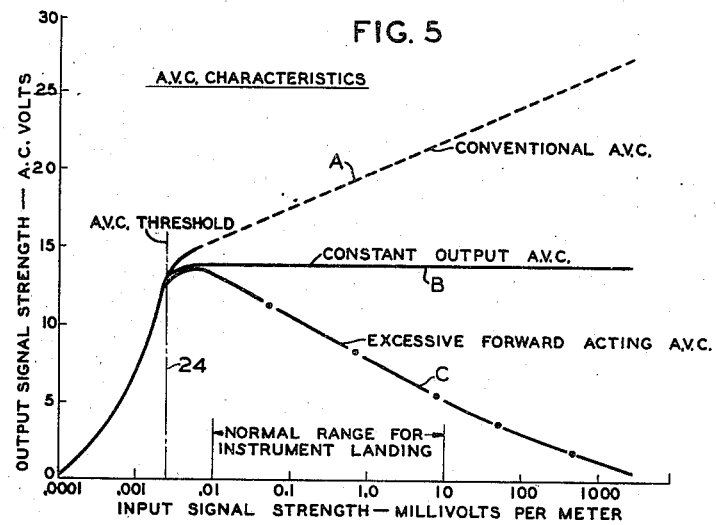
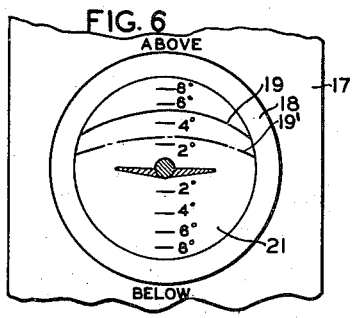
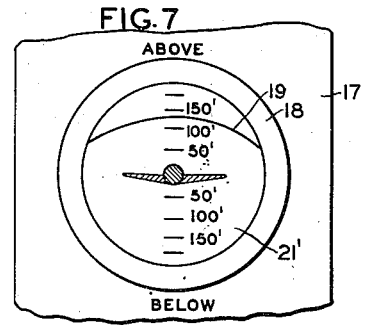
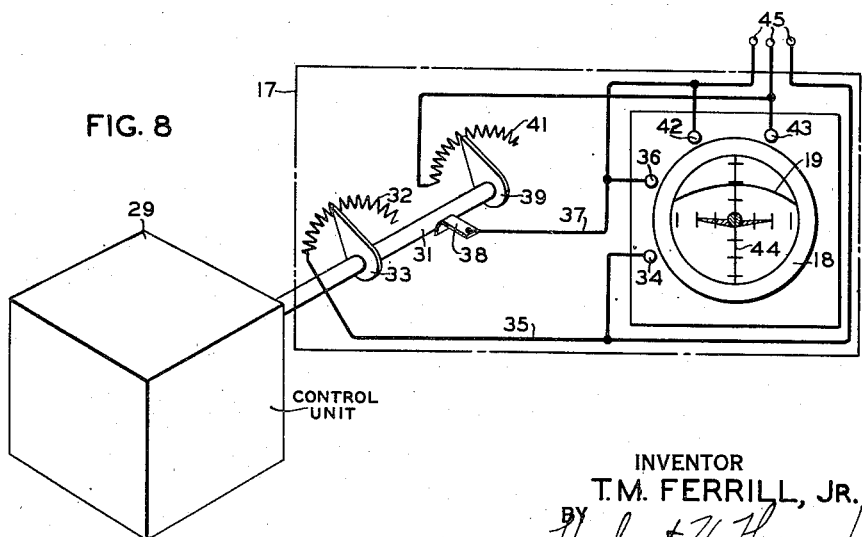
INVENTOR
T.M. FERRILL, JR.
BY Herbert H. Thompson
his ATTORNEY.

Patented Apr. 6, 1948

2,439,044

UNITED STATES PATENT OFFICE 2,439,044

COURSE SOFTENING SYSTEM

Thomas M. Ferrill, Jr., Hempstead, N. Y., assignor to The Sperry Corporation, a corporation of Delaware Application March 4, 1943, Serial No. 478,013

20 Claims. (Cl. 343—108)

This invention relates to navigation systems, and, more particularly, to systems employing electromagnetic energy radiated from a beacon or other transmitting station to define a course for a craft or vehicle.

It is customary in such systems for the course of a craft to be determined by bearings with respect to one or more transmitting stations. According to one system a craft, such as an airplane, may orient itself in accordance with a wave front from, or apparent direction of source of a transmitting station, as by means of a direction finder, so as to fly a course toward the station.

In other instances, it is common for a craft such as a land vehicle, naval vessel, or aircraft, to follow a constant intensity path along a directive radio beam, in which case the craft generally follows a contour line of the beam intensity pattern. Such a system may make use of devices responsive to variations from a predetermined value in the output of a radio receiver, the responses being used to produce indications for the pilot's guidance, or to control, through suitable automatic means, the path along which the craft travels.

More commonly, a craft is guided along a radio range, or directive system defining a desired course. Radio ranges customarily employ two intersecting lobes of radiant energy providing an equisignal zone about which the overlapped lobes are substantially symmetrical. Typical of such directive systems is the standard practice employed for the radio instrument landing of aircraft by fixing accurately defined localizer and glide paths to guide a craft in azimuth and elevation, respectively, to a proper landing.

In all of the foregoing systems, and especially in homing systems, difficulty may be experienced from the increasingly critical apparent course sharpness as the craft approaches a beacon station, caused primarily by the relatively greater responsiveness of the indicator to a given transverse deviation from the course as the distance between the craft and the station decreases. In the case of aircraft instrument landings, the increased sensitivity is especially objectionable because it makes the path extremely hard to follow during the last few seconds of flight, during which time the landing path indicating instrument may appear to swing rapidly from an extreme indication for flight upward to an extreme indication for flight downward (or from left to right, in localizer indications).

A preferred sensitivity of the instrument landing system to airplane departures from course is such a sensitivity as to allow the pilot to judge his distance from the desired course by the magnitude of indicator displacement so that corrective influences on the controls may be governed accordingly. The parallel of this in automatic flight is a course sensitivity such that the amplitude of course departure indications may automatically control the extent of flight path alterations resulting. In either manual or automatic landing, then, it is apparent that the ratio of flight meter deflection or automatic pilot control signal voltage to the distance from course should be limited either to a constant value or to a very narrow range.

To accomplish this objective it is proposed herein to provide methods of and apparatus for so desensitizing the receiver progressively as the craft approaches the beacon station that equal displacements from course evoke substantially constant responses irrespective of increased carrier signal strength. The angular course sensitivity is thus softened, or rendered less critical, and the corrective responses per degree departure from course are moderated, rendering the system apparently more stable, and assisting the manual or automatic pilot in effecting a normal landing.

The invention may be more thoroughly understood from the following theoretical considerations. The ratio of the instrument deflection $d$ to the transverse displacement $D$ is given by the equation:

$$\frac{d}{D} = \frac{kg}{S^2} \qquad (1)$$

where $d$ = the meter deflection in equal linear units;
$D$ = the transverse displacement or extent of departure of the craft in linear units from the glide path or other course;
$S$ = the distance between the transmitter and the craft containing the receiver;
$k$ = a constant separately chosen for each equation to designate a suitable proportionality factor; and
$g$ = the gain of the receiver.

When the flight indicator receiver has no automatic volume control provisions and the receiver amplification factor or gain $g$ is constant, Equation 1 simplifies to $$\frac{d}{D} = \frac{k}{S^2} \qquad (2)$$

With the foregoing conditions, the ratio $$\frac{d}{D}$$

varies inversely as the square of the distance from the transmitter, so that full scale deflection is obtained for very small displacements when the distance $S$ is small, and for very large displacements when the distance is large. This arrangement is undesirable because it renders the course extremely critical as the distance or range decreases, and renders the system quite unsuitable for instrument landing purposes wherein noncritical responses are essential when the craft approaches the transmitting station.

An improvement has been obtained by employing a receiver having a thorough automatic volume control system producing substantially constant output. In this case the gain is proportional to the distance between the transmitter and the craft, and the ratio of the meter deflection to the transverse displacement from course is an inverse function of distance, as expressed by the equations $$\frac{d}{D}=\frac{kg}{S^2}=\frac{k_1 S}{S^2}=\frac{k_1}{S} \quad (3)$$

As in the previous instance, the ratio increases as the distance decreases so that a given deflection occurs at undesirably large displacements at great distances, and at undesirably small displacements at short distances from the transmitting station.

It has been determined that constant meter deflection for equal displacements from course at all distances from the transmitting station $$\left(\text{constant } \frac{d}{D}\right)$$

might be obtained if the gain of the receiver were proportional to the square of the distance from the transmitting station as indicated by the equation:

$$g = k_2 S^2$$

A moderate departure from such an ideal constant $$\frac{d}{D}$$

condition has been used satisfactorily in the system of the invention in which the gain is empirically established as:

$$g = k_3 S^x, \text{ where } 1 < x < 2$$

Thus, it becomes apparent that the gain varies as a power function of the distance and may approach the $g = k_2 S^2$ condition illustrated in Fig. 3. Under these circumstances the ratio of meter deflection to transverse displacement varies inversely as a fractional power of distance and approximates a constant value, as indicated in the following equation:

$$\frac{d}{D} = \frac{k_4}{S^y}, \text{ where } 0 < y < 1$$

or $$\frac{d}{D} = k_4 S^{\frac{-1}{z}}, \text{ where } z > 1 \quad (4)$$

The relations between the respective variables are not critical as the trends of operation allow some departure from linear $$\frac{\Delta d}{\Delta D}$$

conditions and some variations of the $$\frac{d}{D}$$

variation is generally permissible during a flight. For some types of operation slight change of $$\frac{d}{D}$$

is a desirable course characteristic.

In the ensuing description the principles of the invention will be described specifically as applied to an aircraft instrument landing system, and more particularly as applied to the glide path, or path defining the course elevation in relation to distance from the landing point. It will be apparent from the description, however, that equivalent mechanism may be used to direct the craft with respect to a localizer for azimuthal adjustment of headings, and that the principles of course softening, as herein disclosed, are applicable generally to all forms of radio navigation wherein deviations or displacements of a certain distance produce corrective responses of amplitude dependent on the distance between the craft and the radiant energy source, e. g., a transmitter or energy-reflecting object.

The principal objects of the present invention are: to provide improved characteristics for radio range systems; to provide a radio range system wherein the responses to deviations of given angular extent from course are moderated as the craft approaches the transmitting station; to provide apparatus for and methods of softening the angular course indications of an aircraft as a function of the signal intensity or field strength; to provide a course softening system for aircraft instrument landings wherein the sensitivity of the corrective indications or responses to fixed transverse deviations, horizontal, vertical, or horizontal and vertical, is modified altimetrically; and to provide methods of and apparatus for desensitizing an instrument landing meter or other corrective device as a function of the distance of the craft from the transmitting station or the distance of the craft from the point of airport contact.

These and other objects will become apparent from the following description and from the accompanying drawings disclosing the manner in which the invention may be applied to an instrument landing system.

In the drawings,

Fig. 1 comprises a diagram in side elevation of a pair of overlapping lobes of electromagnetic energy used to define a glide path extending along the equisignal loci of the overlapping lobes.

Fig. 5 is a graph disclosing the effect of various types of automatic volume control on the strength of the output signal.

Figs. 6 and 7 are elevational views of an instrument landing meter with deviations expressed in terms of angles and transverse deviation, respectively, and Fig. 8 is an isometric schematic view of an apparatus that might be used to provide progressive desensitizing of the corrective responses.

Generally speaking, the invention comprehends compensating for the sharpening of a glide path or other course defined by a radiant energy beam, as the craft approaches the beacon station. The undesirable sharpening, caused by progressive narrowing of the field, may be overcome by desensitizing the receiver or corrective device of the craft as a function of the field strength of the beam.

Figure 1:
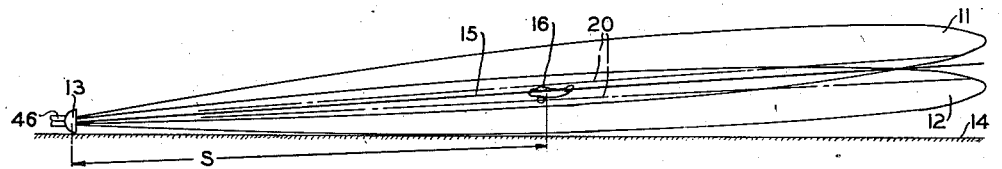

In aircraft instrument landing installations, it is customary to radiate a pair of highly directive beams of electromagnetic energy to form lobes 11 and 12, of the general type shown in Fig. 1, though a single oscillating or rotating lobe may be used instead. The lobes are projected from a transmitting station having suitable highly directive radiator 13 which may comprise one or more concave reflectors, preferably of cylindrical-parabolic shape, oriented with respect to the ground 14 so as to project the lobes 11 and 12 in slightly over-lapping relation generally near the ground 14. A line 15 extends symmetrically from the radiator along the overlapped portions of the lobes 11 and 12 and forms the desired equisignal zone or glide path for an aircraft 16. The energy of each of the lobes 11 and 12 is keyed or modulated distinctively so as to be distinguishable when the signals are detected by a receiver R in the aircraft 16. As a typical example, the lobes 11 and 12 may comprise radiant energy beams modulated at 900 cycles and 600 cycles, respectively. The aircraft receiver R is provided with separate selective amplifying circuits individually responsive to the respective modulation frequencies, and adjusted for equal output signals when the craft is in the equisignal zone as more particularly shown in Patent 2,307,023 to W. T. Cooke et al., dated January 5, 1943, and reissued May 23, 1944, as Patent Re. 22,484. However, when the craft deviates from its normal course, the field strength or signal intensity of the respective lobes varies, producing a differential between the responses of the respective output circuits, which differential is operable to control a flight indicator, or craft steering means. Accordingly, as the aircraft 16 deviates upwardly or downwardly, the output circuits are adapted to produce corrective responses as a function of the relative increase of one beam and decrease of the other from the normal balanced condition.

The signal intensity varies as the length of the radius vector extending from the radiator 13 to the respective points on the envelope or outline of each lobe 11 and 12. Accordingly, the differential between the signals derived from the upper and lower lobes is represented by relative changes in the radius vectors attending a departure from course. In standard practice, it is customary to provide maximum corrective indication or response when the craft has departed from the glide path a distance sufficient to shift the radius vectors through a small angle, for example, 0.5°. This arrangement is graphically disclosed in Figs. 1 and 2, wherein full scale correction indication for the up and down directions is obtained along limiting radii 20, displaced angularly from the glide path 15. In both Figs. 2 and 3 the angle of the glide path with respect to the earth, and the extent of departure represented for maximum indication or output have been exaggerated to simplify the disclosure.

The glide path angle is determined by the physical relationships between the parts in, and the position of, the radiator 13, and by the relative intensity (normally balanced) of reception from the upper and lower lobes. In one embodiment, the radiant energy is fed to the radiator 13 by mutually adjoining conduits, such as horns or wave guides 46 located near the focus of the reflector. With this arrangement, an intensity pattern of the general type shown in Fig. 1 may be obtained. The radiating mechanism may be adjusted to vary the glide path through any desired angle relative to the ground as from 2° to 5°, or the relative responsiveness of the receiver aboard the aircraft, or the relative strength of the antenna radiation lobes may be altered to accomplish this purpose.

Figure 4:
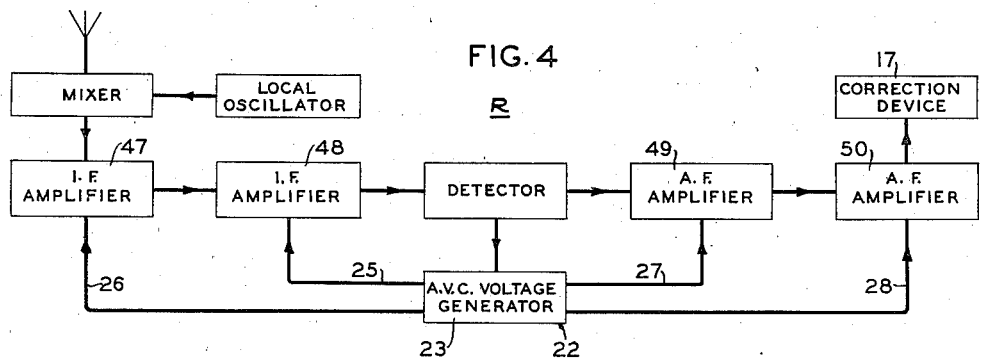
Fig. 4 is a block diagram of a typical receiver showing one form of course softener.

The corrective indications from the instrument landing system may be utilized on any form of indicator or correction device 17, such as shown in Figs. 4, 6 and 8, connected to the output amplifier 50 of the receiver R, with suitable differential circuits, for example, by means of band pass filters and opposed rectifiers, all as shown in the previously mentioned patent. The correction device may comprise any suitable mechanism responsive to the amplifier signals to indicate or to cause correction in the craft attitude so as to restore the craft to its course. The device 17 may be a flight-controlling mechanism or servo system operable to control the steering gear automatically, or the device may comprise a flight indicator such as a meter 18 having a pointer 19 cooperative with a scale 21 to indicate to the pilot the approximate extent of deviation of the craft from the glide path or other course. Ordinarily in instrument landing systems a meter 18, having crossed pointers, is utilized to indicate the horizontal and vertical components of the craft's departure from the course, the intersection of the pointers serving as an index either of the craft position with respect to the course, or of the course with respect to the craft position. To simplify the description, however, only a single pointer 19 is shown, so arranged as to indicate the glide path elevation relative to the craft.

Figure 2:
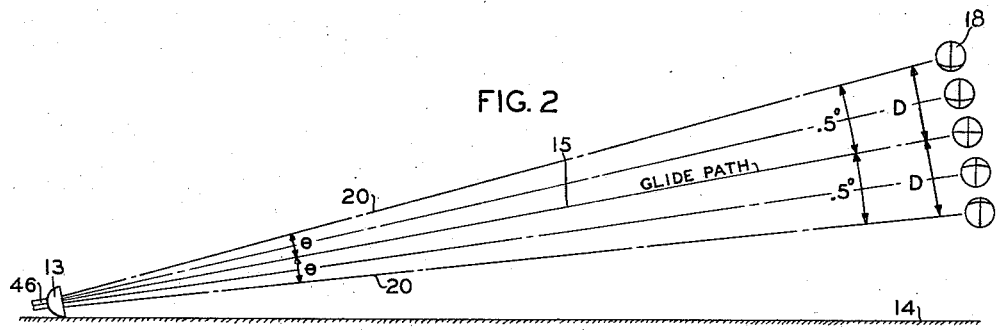
Fig. 2 is a diagram of a glide path with the extreme and intermediate departures from the glide path course indicated as angular deviations.

It will be apparent from Fig. 1 that when the craft has deviated from the glide path, the relative signal intensities of the two received beams change as a function of the angular displacement as measured by the arc $\theta$ formed between the glide path or other course and the radius vector from the transmitter to the craft, which arc $\theta$ hereinafter is referred to as the deviation angle. In Fig. 2, the vectors 20 at the deviation angle of 0.5° indicate the maximum permissible deviation from course resulting in full scale deflection of the meter 18, as shown in the small views at the right end of each vector 20. Corresponding views illustrate the meter needle positions at dead center and at half-scale deflections, respectively.

Figure 3:
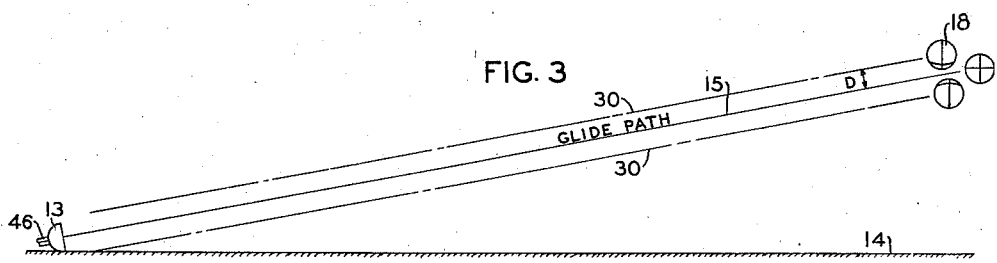
Fig. 3 is a diagram similar to Fig. 2 but wherein the maximum departure from the glide path course is indicated as a fixed transverse distance.

The principal difficulty with any such arrangement providing corrective responses in terms of angular deviation is that the pilot is not advised thereby of the transverse extent of his departure D from course unless he knows the distance S of the craft from the transmitting station or radiator 13, in which case the transverse departure must be computed, e. g., as S tangent $\theta$. Ordinarily, the pilot does not readily know the exact distance from the transmitting station and even if he knows the distance, he is handicapped if the required corrective movement of the craft for a transverse departure must be computed. When S equals 100,000 feet, the transverse departure D to the limiting vector 20 is equal to 873 feet. In other words, the craft may depart 873 feet from its course before a full scale reading on the meter 18 is obtained. When S equals 10,000 feet, however, the craft may deviate only 87.3 feet before a full scale correction indication is obtained, while at 1,000 feet distance a similar full scale reading is obtained with transverse departure of less than 9 feet from the glide path. This sharpening of the course renders it extremely difficult for the pilot to accurately manipulate his craft during the last seconds before contact on the airport. This difficulty has been overcome in the present invention by compensating the signals resulting from a given transverse departure so that the responses to such departures are more uniform over the entire range of distances from the station. Fig. 3 represents an arrangement wherein full scale up or down corrections are provided for a uniform transverse departure defined by the limiting paths 30, irrespective of any distance considerations between the craft and the beacon station. This arrangement may be approximated with such an instrument landing system as present used, by progressively desensitizing the receiver R as the transmitting station is approached. The small views of meter 18, at the right of paths 30 in Fig. 3, disclose the deflection of the pointer corresponding to this fixed transverse displacement from the glide path. The improved result is thus obtained by so densensitizing the receiving system that any predetermined correction indication is provided for increasing values of arc $\theta$ as the range or distance between the craft and the transmitting station decreases. Conversely, the sensitivity to equal deviation angles decreases as the distance increases.

Although, various arrangements may be employed to obtain the desensitizing action, one such arrangement comprises a particular type of automatic volume control circuit 22, as shown in Fig. 4. The receiver R comprises a conventional superheterodyne receiver tuned to receive the carrier frequency of the transmitter producing the lobes 11 and 12, and having two intermediate frequency amplifier stages 47, 48 and two audio frequency amplifier stages 49, 50. An automatic volume control generator 23 comprises a conventional rectifying unit adapted to form a direct current voltage varying as the carrier strength or field intensity of the lobes 11 and 12.

With conventional amplified automatic volume control operation, the generator 23 applies a biasing voltage along connections 25 and 26 solely to the two intermediate frequency amplifier stages, and possibly to the detector, the relation of the output signal strength in alternating current voltages to the input signal strength in millivolts per meter being illustrated by the curve A in Fig. 5, wherein the line 24 designates the threshold of automatic volume control operation. In cases where constant output is desired, as shown in curve B in Fig. 5, use may be made of forward acting automatic volume control, for example, by applying the volume control voltage along connection 27 to the first audio frequency amplifier 49.

Suitable desensitizing of the receiver such that the output signal strength falls off progressively with increases in the input signal strength, as shown by the curve C in Fig. 5, may be obtained by over-compensating with forward-acting automatic volume control. One manner by which this may be obtained is to apply the automatic volume control voltage additionally to the second audio amplifier 50 as by connection 28, or by suitably amplying the correcting voltage on the preceding stage. Fig. 4 discloses the former arrangement, wherein the automatic volume control generator 23 is connected to four amplifier stages, two on either side of the control circuit.

In operation, the receiver R detects and amplifies the radiant energy from the respective lobes 11 and 12. As long as the signals received from both lobes are of equal intensity, no response is applied to the correction device 17. However, when the energy from either lobe exceeds that of the other, the correction device 17 is energized as a function of the difference in the signal strengths S. For a given transverse departure from course at a large distance S from the radiator 13, a relatively small arc $\theta$ is formed, and accordingly only slight variation in the relative signal strengths S of the respective lobes occurs. At this large distance, the field strength is weak, for example, 0.01 millivolt per meter. By referring to curve C of Fig. 5 it will be seen that the output at this level is relatively high. As the craft approaches the radiator 13, the signal strength may increase to 10 millivolts per meter. At the shorter distance from the radiator a similar transverse departure results in a considerably larger angle $\theta$, so that the change in relative strength of the upper and lower lobes occasioned by the departure would, with a constant output receiver, be materially greater. This effect is compensated, however, according to the curve C, the larger angular deviations near the energy source being given less response by the receiver, so that a more uniform response is produced in the correction device for a given transverse departure D.

With present systems, it is customary to calibrate the scale 21 of the meter 18 in terms of angular deviation of the radius vector, e. g., vector 20, since the correction signal normally is a function of the arc $\theta$. It will be apparent, however, that the pointer 19 may be positioned as shown in Fig. 6 for a given transverse departure when S equals 1,000 feet distance, and may be positioned as shown at 19' for the same departure distance D, when S equals 10,000 feet. Hence, with former arrangements the pilot was urged to make a large correction in the aircraft attitude because of a large deflection of the pointer 19, whereas the deflection may have been occasioned by a relatively minor departure while the craft was near the radiator. Any material shift in the craft direction at this stage results in violent "hunting" for the glide path, causing serious variations in the craft's motion during the critical last seconds of glide.

With the improved device, as herein disclosed, the deflection of needle 19 is more nearly uniform over a major portion of the glide path, and the scale 21' could be calibrated in terms of departure distance, as shown in Fig. 7. Under these circumstances, the departure of the craft from its course is revealed directly in linear units, and the deflection is substantially independent of the distance S.

Although the receiver desensitizing arrangement shown in Fig. 4 depends on the change in field intensity at different distances from the radiator 13, other devices may be used to soften the operation of the correction device 17 as the craft approaches the beacon station. Fig. 8 discloses a modified device that may be applied in desensitizing the glide path meter 18 or corresponding automatic control mechanism. A control unit 29 is provided to vary the sensitivity as a function of the distance S. The control unit 29 may be any convenient range detecting device, such as an odometer, a clock mechanism operating as a function of a known craft speed, or a device adapted to measure distance as a function of the time required for radiant energy to travel from the craft to the station and to be reflected to the craft. With instrument landing systems, since the aircraft descends along a definite glide path, the distance may be measured altimetrically, that is, as a function of the reading of a barometric altimeter. For purposes of the present description it will be assumed that the unit 29 of Fig. 8 comprises such an altimetric device having a shaft 31 projecting therefrom and rotatable in a counter-clockwise direction (as viewed in the drawing) as the altitude decreases.

Although any desired control effect may be exercised on the correction device 17, a simple arrangement for use with a meter 18 having an electrically deflected pointer 19, comprises a variable shunt 32 having a movable contactor 33 arranged to provide decreasing resistance with a decrease in altitude. The meter may be progressively desensitized by the shunting resistance 32 connected across the terminals of the meter movement. Thus, one end of the resistance 32 may connect with one terminal 34 of the meter 18 through wire 35. The second terminal 36 may connect with the contactor 33 as by wire 37 and contact shoe 38. Accordingly, as the aircraft descends, the shaft 31 rotates so as to cause the contactor 33 to decrease the shunt resistance across the meter 18, and the meter indication accordingly becomes less sensitive to variations when the craft approaches the transmitting station, thereby softening the course. The rate at which the meter 18 is desensitized depends upon the degree of rotation of the shaft 31, and the spacing of the successive turns of resistance wire on the shunt 32, but it will be apparent that by varying one or both, the sensitivity may be varied to follow any desired function.

A second contactor 39 and shunt 41 may be used to control the sensitivity of an automatic steering device, or a second pair of terminals 42, 43 on the meter 18, which terminals may connect with a meter movement, such as an aircraft instrument landing localizer indicator movement adapted to deflect a second pointer 44 horizontally to indicate horizontal departures from course. Terminals 45 provide a means for connecting the meter 18 to the output amplifier 50 of the receiver R.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of denoting transverse extent of departure of a craft from a prescribed course relative to an energy-radiating station, comprising detecting radiant energy variations resulting from said transverse extent of departure, deriving corrective responses from said energy variations, and as said craft approaches said station lessening the response per unit of variation.

2. A method of denoting transverse departure of a craft from a course defined by a radiant energy beam extending from a transmitting station, comprising detecting radiant energy variations resulting from a given transverse departure, deriving corrective responses from said energy variations, and decreasing the response per unit of variation as the energy level of said beam increases.

3. In a method of guiding a craft along a prescribed course relative to an energy-radiating station by deriving corrective responses from detected radiant energy variations resulting from a transverse displacement of said craft from said course, the step of compensating for unequal responses to equal displacements from said prescribed course at different distances from said station, said step comprising altering the response per unit of variation as an inverse function of said distance.

4. In a method of guiding a craft along a course in accordance with responses derived from electromagnetic energy received from a radio transmitting station, the step of rendering responses resulting from a predetermined transverse displacement of said craft from said course more nearly uniform for all distances of said craft from said transmitting station, said step comprising varying the magnitude of said responses to a given deviation angle as a direct function of said distance.

5. A method of denoting transverse departure of a craft from the equi-signal zone formed by overlapping lobes of electromagnetic energy, comprising detecting electromagnetic field intensity differentials resulting from a given transverse extent of departure, forming indications of said departure as a function of said differentials, and varying said indications inversely as a fractional power of distance from the source of said energy.

6. A method of denoting the transverse extent of departure of an aircraft from a glide path formed by intersecting lobes of electromagnetic energy radiated from a transmitting station, comprising detecting electromagnetic field intensity variations resulting from a given transverse extent of departure, forming indications of such departure in response to such variations, and decreasing the response of said indications per unit of variation resulting from said transverse extent of departure as said aircraft approaches said station.

7. A method of denoting a given transverse displacement of an aircraft from a glide path formed by intersecting lobes of electromagnetic energy radiated from a transmitting station, comprising detecting normally constant electromagnetic field intensity variations resulting from a given deviation angle, forming indications of such given displacement in response to such variations, and decreasing the responsiveness of said indications to such given deviation angle as a function of the absolute altitude of said aircraft.

8. A deviation corrector for a craft traveling a course defined at least partly by electromagnetic energy emanating from a transmitting station, said corrector comprising means for deriving corrective responses from variations in said electromagnetic energy occasioned by a given transverse displacement of said craft from said course, and compensating means responsive to the distance of said craft from said station for varying the sensitivity of said corrector as an inverse fractional power function of said distance.

9. A flight indicator for an aircraft flying a course extending along a radio beam emanating from a transmitting station, said indicator comprising meter means responsive to variations in the field strength of said beam occasioned by a given transverse departure of said aircraft from said course, and compensating means responsive to the field strength of said beam for decreasing the sensitivity of said meter means as an inverse fractional power function of said field strength.

10. In combination with a flight indicator for an aircraft flying a course extending along a radio beam emanating from a transmitting station, which indicator produces indications of transverse departures of said aircraft from said course in response to relative variations in the field intensity of said beam occasioned by such departures, a compensator responsive to the field strength of said beam for varying the sensitivity of said indicator as a function of said field strength.

11. A course softener for a flight indicator responsive to transverse displacement of an aircraft from an equi-signal line disposed along overlapping lobes of electromagnetic energy projected from a radiator, said softener comprising means for rendering said indicator progressively less responsive to a given transverse displacement as said aircraft approaches said radiator.

12. In an instrument landing system, meter means responsive to transverse displacement of an aircraft from an electromagnetic equi-signal glide path, and a course softener automatically operable as said aircraft progresses downwardly along said path to progressively lessen said meter response to a given transverse displacement.

13. In an instrument landing system wherein overlapping lobes of electromagnetic energy are radiated from a ground station to define a glide path for aircraft, the combination comprising meter means responsive to variations in field intensity occasioned by transverse displacement of aircraft from said glide path, and a course softener responsive to the field strength of said lobes, said course softener being operative on said meter means to render said meter means substantially equally responsive to a given transverse displacement over the major portion of said glide path.

14. In an instrument landing system wherein overlapping lobes of electromagnetic energy are radiated from a ground station to define a glide path for aircraft, the combination comprising a receiver for said aircraft adapted to receive energy projected along said respective lobes, said receiver including means for forming responses in accordance with variations in said energy resulting from transverse displacement of said aircraft from said path, a correction device operative on said receiver and responsive to the energy level of said lobes for maintaining substantially constant responses to given displacements at all distances between said aircraft and said station.

15. A course softener for an aircraft instrument landing receiver adapted to compensate for the increase in the relative variation of the course determining field strength for a given transverse extent of departure as said aircraft approaches a landing, said softener comprising control means operative on said receiver to progressively lessen the response of said receiver per unit of variation as said field strength increases.

16. A course softener as claimed in claim 15 wherein said control means comprises a field strength detector, and means operative thereby for varying the output of an audio frequency amplifier in said receiver.

17. A course softener for an instrument landing flight indicator responsive to departures of an aircraft from an equi-signal line disposed along overlapping lobes of electromagnetic energy projected from a radiator, said softener comprising altimetrically controlled means for varying the sensitivity of said indicator to a given angular departure from said line as a function of the altitude of said aircraft.

18. In a course softener for an aircraft instrument landing course indicator normally equally responsive at all distances to a given deviation angle from a prescribed course along a beam of electromagnetic energy radiated by a ground station, the combination comprising indicator-desensitizing means, and control means responsive to the distance between said aircraft and said station for operating said desensitizing means so as to vary the responsiveness of said indicator to said given deviation angle as a direct function of said distance.

19. A course softener for an aircraft instrument landing receiver adapted to compensate for the increase in the relative variation of the course-determining field strength for a given transverse extent of departure as said aircraft approaches a landing, said softener comprising control means operative on said receiver to progressively lower the output intensity of said receiver as the input signal strength increases.

20. In combination with a flight indicator for an aircraft flying a course defined by electromagnetic energy propagated from a transmitting station, which indicator produces indications of transverse departures of said aircraft from said course in response to relative variations in the field intensity of at least a portion of said propagated electromagnetic energy occasioned by such departure, a compensator responsive to the field strength of at least a portion of said propagated electromagnetic energy for varying the sensitivity of said indicator as a function of said last mentioned field strength.

THOMAS M. FERRILL, Jr.

REFERENCES CITED

The following references are of record in the file of this patent:

UNITED STATES PATENTS

| Number | Name | Date |
|---|---|---|
| 1,999,047 | Hahnemann | Apr. 23, 1935 |
| 2,086,229 | Kotowski | July 6, 1937 |
| 2,110,761 | Diamond et al. | Mar. 8, 1938 |
| 2,264,063 | Bond | Nov. 25, 1941 |
| 2,309,314 | Harshaw | Jan. 26, 1943 |

FOREIGN PATENTS

| Number | Country | Date |
|---|---|---|
| 496,217 | Great Britain | Nov. 25, 1938 |